July 22, 1924.
A. J. BOCKWITZ
1,502,231
SHOCK ABSORBER
Filed Oct. 21, 1921    2 Sheets-Sheet 2
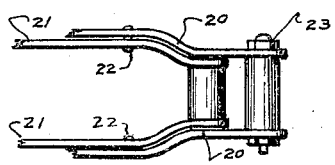
Fig. 5.
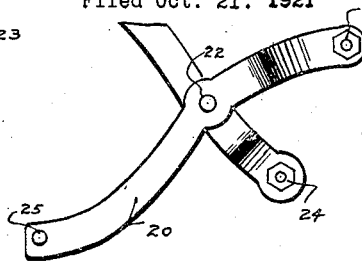
Fig. 4.
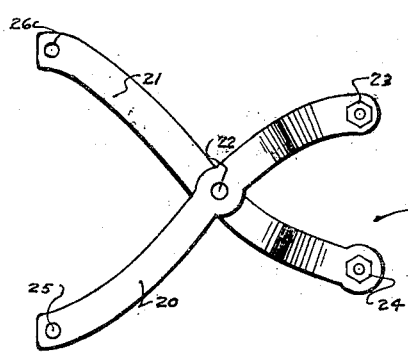
Fig. 6.
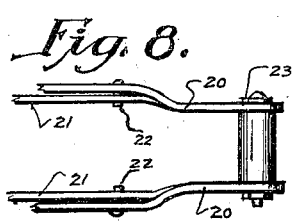
Fig. 8.
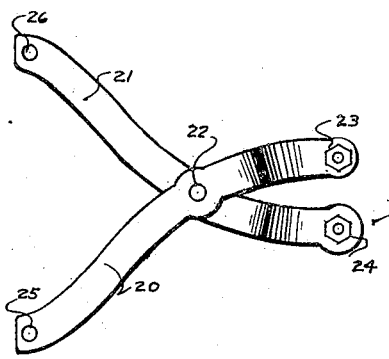
Fig. 7.
Fig. 10.    Fig. 9.
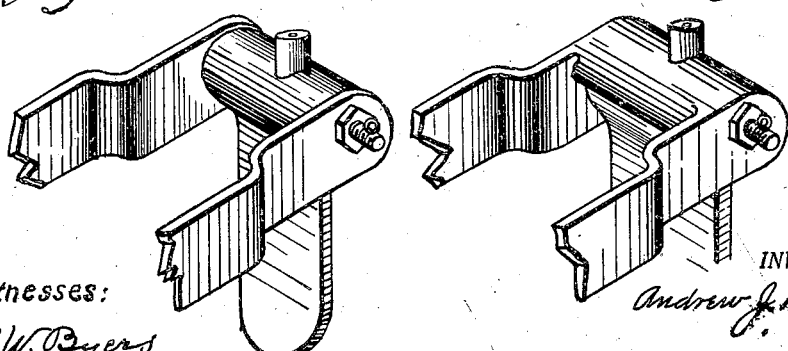
Witnesses:
P. W. Byers
G. H. Self
INVENTOR.
Andrew J. Bockwitz Patented July 22, 1924.

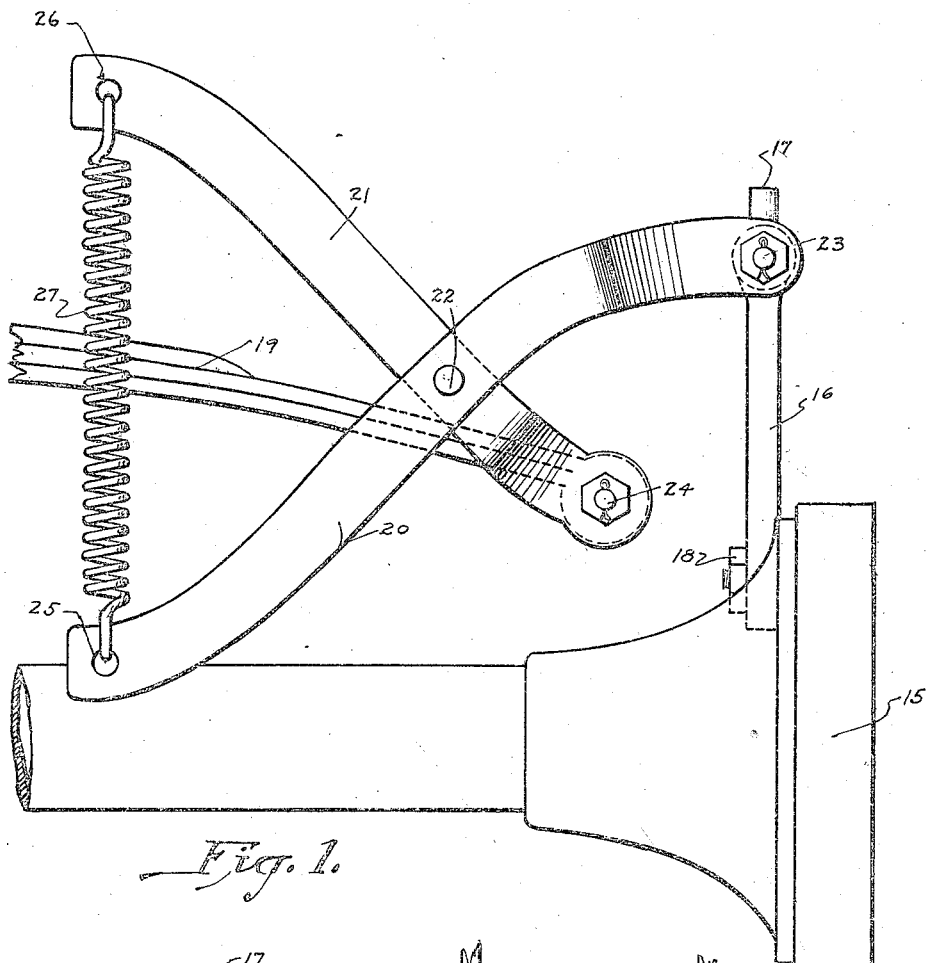
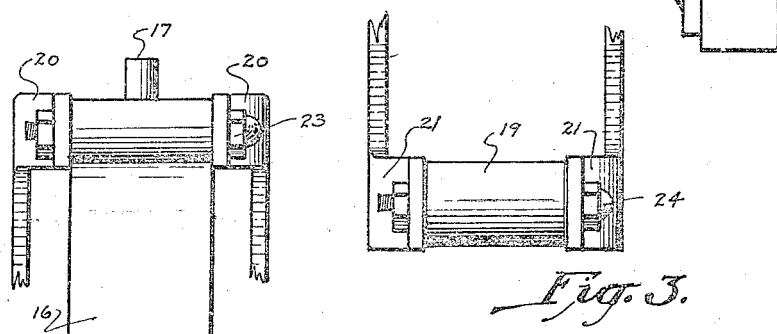

1,502,231

UNITED STATES PATENT OFFICE.

ANDREW J. BOCKWITZ, OF TWIN FALLS, IDAHO.

SHOCK ABSORBER.

Application filed October 21, 1921. Serial No. 509,413.

*To all whom it may concern:*

Be it known that I, ANDREW J. BOCKWITZ, a citizen of the United States, residing at Twin Falls, in the county of Twin Falls and State of Idaho, have invented new and useful Improvements in Shock Absorbers, of which the following is a specification.

This invention relates to shock-absorbers for vehicles and the object thereof is to give more resiliency on the downward motion of the main spring and body of the vehicle, and to absorb and prevent the abrupt upward motion of the main vehicle spring and body.

A further object of the invention is the provision of means for the various forms and lengths of the shock-absorber arms and springs suitable for their various construction and uses without altering the principle of the invention.

Further objects of the invention will appear as the specific description which follows is read in connection with the accompanying drawings forming a part of this specification and in which:—

Figure 1 shows application of one form of shock-absorber applied.

Figure 2 is an end view.

Figure 3 is an end view.

Figure 4 is a side view.

Figure 5 is a top view of Figure 4.

Figure 6 is a side view.

Figure 7 is a side view.

Figure 8 is a top view of Figure 7.

Figure 9 is a diagonal end view.

Figure 10 is a diagonal end view.

Referring more especially to the drawing 15 of Figure 1 represents the axle housing, 16 the spring perch, 17 means for oiling bearing and bolt at 23. 18 means for connecting spring perch to axle housing, 19 is main vehicle spring, 20 is shock-absorber arm one end pivotally connecting with spring perch and opposite end to shock-absorber spring. 21 is shock-absorber arm pivotally connected at one end with main vehicle spring and opposite end to shock-absorber spring. 22 is hole and means for pivotally connecting shock-absorber arms 20 and 21 with bolt or rivet. 23 is hole and means for pivotally connecting shock-absorber arm 20 to spring perch 16. 24 is hole and means for pivotally connecting shock-absorber arm 21 to main spring 19. 25 is hole or means for connecting end of shock-absorber arm 20 to shock-absorber spring 27. 26 is hole or means for connecting end of shock-absorber arm 21 to shock-absorber spring 27. 27 is a coil spring of suitable size and length connected at either end with arms 20 and 21 for absorbing any abrupt action to main spring 19 and vehicle body.

Figure 2 shows manner of connecting shock-absorber arms 20 to spring perch 16.

Figure 3 shows manner of connecting shock-absorber arms 21 to end of main vehicle spring 19.

Figure 4 shows one form of constructing arms 20 and 21, having the distance less between points 24 and 22 of arm 21 than between points 23 and 22 of arm 20, in this construction as is also shown in Figure 1 the upward motion is partly absorbed by coil spring 27, but principally by the increased strain in main leaf spring 19 in the direction of 24, and this point being below the center or pivotal point 22 causes a locking and absorbing action to any upward movement of main spring 19, in connection with any slight movement in spring 19 will cause a pivotal action at points 23 and 24, thus creating a floating effect to the vehicle body when in motion.

Figure 5 is a top view of arms 20 and 21 as in Figure 4 showing interlapping of arms 20 and 21.

Figure 6 arms 20 and 21 being of equal length, in this construction there is more resiliency than in Figure 4 with less absorption in upward movement of main vehicle spring and body as in Figure 4 and Figure 1; however any movement of main vehicle spring causes a pivotal action at points 23 and 24.

Figure 7 arms 20 and 21 overlap otherwise functions are about the same as in Figure 6.

Figure 8 is top view of Figure 7 showing overlapping of arms 20 and 21.

Figure 9 shows form connecting and making one end of arms 20 solid while not shown same construction can be used in making arms 21.

Figure 10 shows form of making arms 20 single, arms 21 can be also made single as shown in Figure 1.

It is to be understood that the coil shock-absorber springs to be of suitable metal, size and length and that shock-absorber arms may be either made single or double or made solid at one end, either arm may vary in length or contour from that shown in drawings without altering the principle of the invention and that same may be used in combination with two springs, spring and perch spring and axle or body and axle or between two suitable parts of any kind of vehicle or implement.

Having thus described my invention what I claim is:—

In combination with a spring, axle housing and spring perch, a shock absorber having pivotally connected cross arms of unequal lengths between points where said arms pivotally connect together and where they pivotally connect with the spring perch and pivotally connect to the main vehicle spring, a tension coil spring connecting the opposite ends of said pivoted arms, said construction absorbing and preventing any abrupt upward motion of the main spring and vehicle body.

In testimony whereof I affix my signature in presence of two witnesses.

ANDREW J. BOCKWITZ.

In presence of—
GRAFTON H. SELF,
GEORGE BRISTOL.